US012592451B2

(12) United States Patent
Farha et al.

(10) Patent No.: US 12,592,451 B2
(45) Date of Patent: Mar. 31, 2026

(54) VENT FEATURE PROTECTION BRACKETS FOR ELECTRIFIED VEHICLE TRACTION BATTERY PACKS

(71) Applicant: FORD GLOBAL TECHNOLOGIES, LLC, Dearborn, MI (US)

(72) Inventors: Eid Farha, Ypsilanti, MI (US); John Sturza, Royal Oak, MI (US); Patrick Daniel Maguire, Ann Arbor, MI (US); Saravanan Paramasivam, South Lyon, MI (US); Kriste Tomovski, Grosse Pointe Shores, MI (US); Yongcai Wang, Ann Arbor, MI (US); Mohammadreza Eftekhari, Novi, MI (US); Steven Frank, Dearborn, MI (US); Himanshu Khandelwal, Warren, MI (US); Tamil Arunachalam, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 359 days.

(21) Appl. No.: 17/714,471

(22) Filed: Apr. 6, 2022

(65) Prior Publication Data

US 2023/0327283 A1 Oct. 12, 2023

(51) Int. Cl.
H01M 50/30 (2021.01)
H01M 50/308 (2021.01)

(52) U.S. Cl.
CPC ....... H01M 50/394 (2021.01); H01M 50/308 (2021.01); H01M 2220/20 (2013.01)

(58) Field of Classification Search
CPC ....... H01M 50/30–394; H01M 50/131; H01M 50/20–249; H01M 10/44; H01M 10/445;
(Continued)

(56) References Cited

U.S. PATENT DOCUMENTS 6,426,459 B1 * 7/2002 Mitchell .............. H05K 9/0041
174/382
8,367,233 B2 2/2013 Hermann et al.
(Continued)

FOREIGN PATENT DOCUMENTS

| CN | 201307612 Y | 9/2009 | |
| CN | 210716178 U | 6/2020 | |
| CN | 114142155 A | * 3/2022 | ............ H01M 50/30 |

OTHER PUBLICATIONS

CN-114142155-A—English Translation, accessed via Espacenet on Sep. 28, 2023 (Year: 2022).*

*Primary Examiner* — Allison Bourke
*Assistant Examiner* — Bethany C Garcia
(74) *Attorney, Agent, or Firm* — David B. Kelley; Carlson, Gaskey & Olds, P.C.

(57) ABSTRACT

A traction battery pack for an electrified vehicle may include a protection bracket for shielding a vent feature of the traction battery pack. An exemplary protection bracket may be made of a polymeric material and is designed to shield the vent feature from debris impingement. The protection bracket may include features such as a mesh venting pattern and a melting point that is lower than the temperature of battery vent byproducts that may be released during battery thermal events of the traction battery pack.

19 Claims, 4 Drawing Sheets

(58) Field of Classification Search
CPC ............. H01M 10/52; H01M 10/6561; H01M
10/6566; H01M 50/3425; H01M 2220/20;
H01M 10/613; H01M 10/625; H01M
50/209; H01M 50/358; H01M 50/383;
H01M 50/204; H01M 50/271; H01M
2200/00; H01M 2200/20; Y02E 60/10;
Y02E 60/50; Y02T 10/70; Y02T 90/16;
Y02P 70/50; B60L 50/64; B60L 50/66;
B60K 1/04; B60K 2001/0438; H05K
9/0041; F24F 13/082–085
See application file for complete search history.

(56) References Cited

U.S. PATENT DOCUMENTS

| | | | |
|---|---|---|---|
| 9,516,914 B2 | 12/2016 | Dehn | |
| 11,011,736 B2 | 5/2021 | Mack et al. | |
| 2012/0315510 A1* | 12/2012 | TenHouten | H01M 50/227 |
| | | | 429/82 |
| 2015/0228961 A1* | 8/2015 | Park | H01M 50/574 |
| | | | 429/7 |
| 2018/0269440 A1* | 9/2018 | Lee | H01M 50/211 |
| 2018/0269448 A1* | 9/2018 | Shimizu | H01M 50/342 |
| 2022/0131226 A1* | 4/2022 | Chen | H01M 50/249 |

* cited by examiner

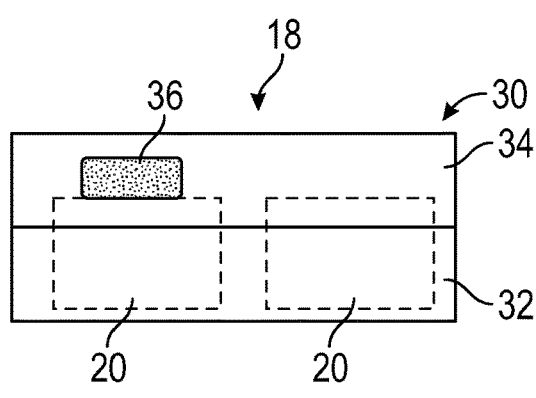
FIG. 2
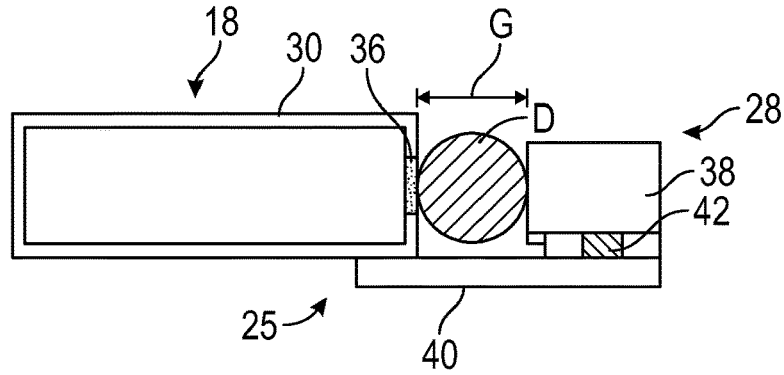
FIG. 3
FIG. 4

VENT FEATURE PROTECTION BRACKETS FOR ELECTRIFIED VEHICLE TRACTION BATTERY PACKS

TECHNICAL FIELD

This disclosure relates generally to electrified vehicles, and more particularly to protection brackets for shielding traction battery pack vent features from debris impingement.

BACKGROUND

Some electrified vehicles include a traction battery pack packaged at external, underbody locations of the vehicle. At such a mounting location, portions of the traction battery pack may be susceptible to debris impingement.

SUMMARY

A traction battery pack according to an exemplary aspect of the present disclosure includes, among other things, an outer enclosure assembly, a vent feature mounted to a portion of the outer enclosure assembly, and a protection bracket arranged relative to the vent feature and configured to shield the vent feature from debris impingement.

In a further non-limiting embodiment of the foregoing traction battery pack, the portion is part of a cover of the outer enclosure assembly.

In a further non-limiting embodiment of either of the foregoing traction battery packs, the portion is part of a tray of the outer enclosure assembly.

In a further non-limiting embodiment of any of the foregoing traction battery packs, the protection bracket is secured to the portion of the outer enclosure assembly by a two-sided adhesive tape.

In a further non-limiting embodiment of any of the foregoing traction battery packs, the protection bracket includes a polymeric body having a front surface that faces in a direction away from the vent feature and a rear surface that faces in a direction toward the vent feature.

In a further non-limiting embodiment of any of the foregoing traction battery packs, the polymeric body is made of polypropylene.

In a further non-limiting embodiment of any of the foregoing traction battery packs, the polymeric body includes a melting point that is less than a temperature of a battery vent byproduct of the traction battery pack.

In a further non-limiting embodiment of any of the foregoing traction battery packs, a plurality of openings is formed through the polymeric body.

In a further non-limiting embodiment of any of the foregoing traction battery packs, the plurality of openings is arranged in a mesh pattern.

In a further non-limiting embodiment of any of the foregoing traction battery packs, the mesh pattern includes a first cross-sectional area that is about equivalent to a second cross-sectional area of an opening of the outer enclosure assembly that is covered by the vent feature.

An electrified vehicle according to another exemplary aspect of the present disclosure includes, among other things, a frame member, a traction battery pack including an outer enclosure assembly, a mounting linkage arranged to mount the traction battery pack relative to the frame member, a vent feature secured to the outer enclosure assembly, and a protection bracket arranged over the vent feature and configured to shield the vent feature from debris impingement.

In a further non-limiting embodiment of the foregoing electrified vehicle, an isolator is arranged between the mounting linkage and the frame member.

In a further non-limiting embodiment of either of the foregoing electrified vehicles, the protection bracket is secured to a cover of the outer enclosure assembly by a two-sided adhesive tape.

In a further non-limiting embodiment of any of the foregoing electrified vehicles, the protection bracket includes a polymeric body having a front surface that faces away from the outer enclosure assembly and a rear surface that faces toward the outer enclosure assembly.

In a further non-limiting embodiment of any of the foregoing electrified vehicles, a maximum forced deflection of the polymeric body is about equal to an amount of relative movement permitted between the traction battery pack and the frame member.

In a further non-limiting embodiment of any of the foregoing electrified vehicles, the front surface includes at least one clipped corner and at least one impression.

In a further non-limiting embodiment of any of the foregoing electrified vehicles, the rear surface includes at least one mounting pad.

In a further non-limiting embodiment of any of the foregoing electrified vehicles, the polymeric body includes a plurality of openings formed therethrough.

In a further non-limiting embodiment of any of the foregoing electrified vehicles, the plurality of openings is arranged in a mesh pattern.

In a further non-limiting embodiment of any of the foregoing electrified vehicles, the polymeric body is made of polypropylene.

The embodiments, examples, and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

The various features and advantages of this disclosure will become apparent to those skilled in the art from the following detailed description. The drawings that accompany the detailed description can be briefly described as follows.

BRIEF DESCRIPTION OF THE DRAWINGS

FIG. 2 illustrates select portions of a traction battery pack of the electrified vehicle of FIG. 1.

FIG. 3 illustrates select portions of an underside of the electrified vehicle of FIG. 1.

FIG. 4 illustrates a protection bracket for shielding a vent feature of a traction battery pack.

DETAILED DESCRIPTION

This disclosure details protection brackets for shielding vent features of electrified vehicle traction battery packs. An exemplary protection bracket may be made of a polymeric material and is designed to shield the vent feature from debris impingement. The protection bracket may include features such as a mesh venting pattern and a melting point that is lower than the temperature of battery vent byproducts that may be released during battery thermal events of the traction battery pack. These and other features are discussed in greater detail in the following paragraphs of this detailed description.

Figure 1:
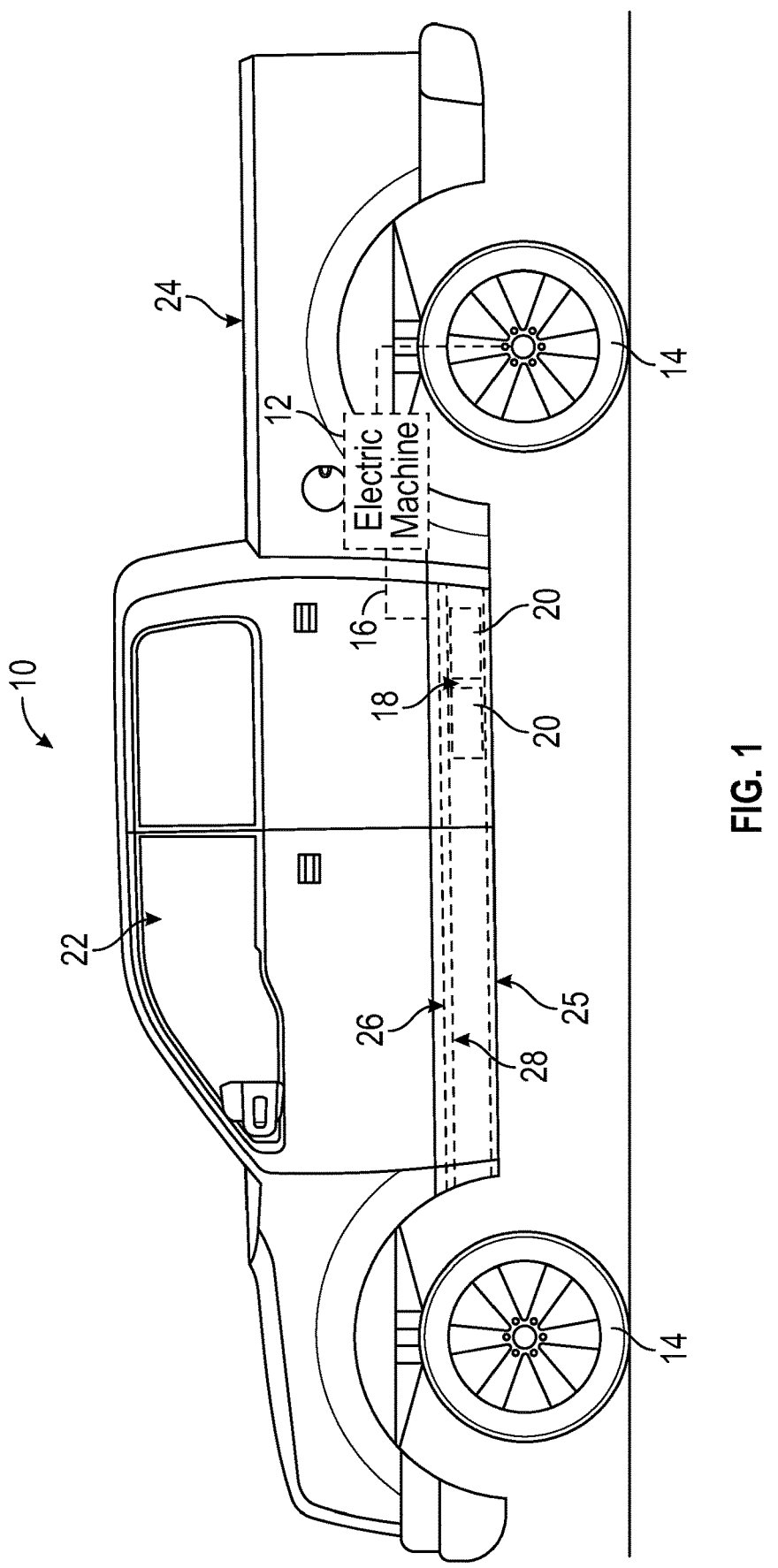
FIG. 1 schematically illustrates an electrified vehicle.

FIG. 1 schematically illustrates an electrified vehicle 10. The electrified vehicle 10 may include any type of electrified powertrain. In an embodiment, the electrified vehicle 10 is a battery electric vehicle (BEV). However, the concepts described herein are not limited to BEVs and could extend to other electrified vehicles, including, but not limited to, hybrid electric vehicles (HEVs), plug-in hybrid electric vehicles (PHEV's), fuel cell vehicles, etc. Therefore, although not specifically shown in this embodiment, the electrified vehicle 10 could be equipped with an internal combustion engine that can be employed either alone or in combination with other power sources to propel the electrified vehicle 10.

In an embodiment, the electrified vehicle 10 is a pickup truck. However, the electrified vehicle 10 could alternatively be a car, a van, a sport utility vehicle, or any other vehicle configuration. Although a specific component relationship is illustrated in the figures of this disclosure, the illustrations are not intended to limit this disclosure. The placement and orientation of the various components of the electrified vehicle 10 are shown schematically and could vary within the scope of this disclosure. In addition, the various figures accompanying this disclosure are not necessarily drawn to scale, and some features may be exaggerated or minimized to emphasize certain details of a particular component or system.

In the illustrated embodiment, the electrified vehicle 10 is a full electric vehicle propelled solely through electric power, such as by one or more electric machines 12, without any assistance from an internal combustion engine. The electric machine 12 may operate as an electric motor, an electric generator, or both. The electric machine 12 receives electrical power and provides a rotational output torque to one or more drive wheels 14.

A voltage bus 16 may electrically couple the electric machine 12 to a traction battery pack 18. The traction battery pack 18 is an exemplary electrified vehicle battery. The traction battery pack 18 may be a high voltage traction battery pack that includes a plurality of battery arrays 20 (i.e., battery assemblies or groupings of rechargeable battery cells) capable of outputting electrical power to power the electric machine 12 and/or other electrical loads of the electrified vehicle 10. Other types of energy storage devices and/or output devices could alternatively or additionally be used to electrically power the electrified vehicle 10.

The traction battery pack 18 may be mounted at various locations of the electrified vehicle 10. In an embodiment, the electrified vehicle 10 includes a passenger cabin 22 and a cargo space 24 (e.g., a truck bed) located to the rear of the passenger cabin 22. A floor pan 26 may separate the passenger cabin 22 from a vehicle frame 28, which generally establishes an underbody 25 of the electrified vehicle 10. The traction battery pack 18 may be suspended from or otherwise mounted relative to the vehicle frame 28 such that it is remote from both the passenger cabin 22 and the cargo space 24. The traction battery pack 18 therefore does not occupy space that would otherwise be available for carrying passengers or cargo.

Referring now to FIG. 2, the traction battery pack 18 may include an outer enclosure assembly 30 for housing the battery arrays 20 and other battery internal components (e.g., electronics, wiring, etc.) of the traction battery pack 18. The outer enclosure assembly 30 may be sealed enclosure having any size, shape, and configuration and may, in an exemplary embodiment, include a tray 32 and a cover 34.

In an embodiment, the outer enclosure assembly 30 is a metallic-based component. For example, the tray 32 and the cover 34 could be constructed out of aluminum or steel.

In another embodiment, the outer enclosure assembly 30 is a polymer-based component. For example, the tray 32 and the cover 34 could be constructed (e.g., molded) of expanded polymer-based materials, solid polymer-based materials, or a combination of such materials. Exemplary expanded polymer-based materials can include, but are not limited to, expanded polypropylene, expanded polystyrene, and expanded polyethylene. Exemplary solid polymer-based materials can include, but are not limited to, sheet moulding compounds (e.g., glass-fiber reinforced polyester), polypropylene, and polyamine.

In yet another embodiment, the outer enclosure assembly 30 could be constructed of both metallic-based and polymer-based components. For example, the tray 32 could be a metallic-based component, and the cover 34 could be a polymer-based component. Other configurations are also contemplated within the scope of this disclosure.

The outer enclosure assembly 30 may further include a vent feature 36, which may sometimes be referred to as a pressure equalization feature. The vent feature 36 may be a vent patch, filter, or some other porous membrane that may be disposed within a wall of the outer enclosure assembly 30 for providing pressure equalization between the interior of the traction battery pack 18 and atmosphere. The vent feature 36 may allow gases (e.g., air) to flow in and out of the outer enclosure assembly 30 while preventing moisture, particle contaminants, etc. from entering the interior of the traction battery pack 18.

Figure 9:
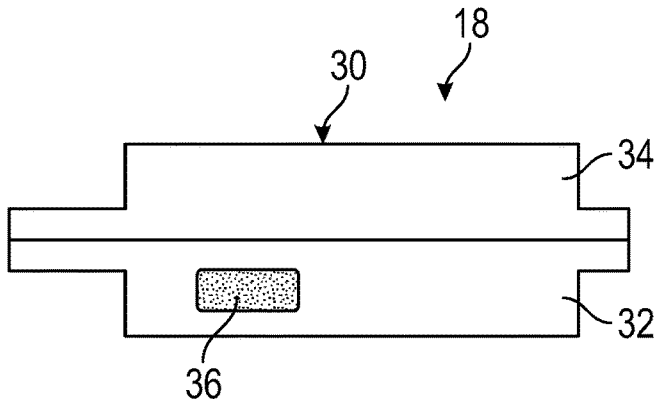
FIG. 9 illustrates select portions of another exemplary traction battery pack.

The vent feature 36 may be secured to a portion of the outer enclosure assembly 30. In an embodiment, the vent feature 36 is secured to the cover 34 of the outer enclosure assembly 30. In another embodiment, the vent feature 36 is secured to the tray 32 of the outer enclosure assembly 30 (see FIG. 9). However, the specific mounting location of the vent feature 36 is not intended to limit this disclosure.

FIG. 3, with continued reference to FIGS. 1-2, schematically illustrates the traction battery pack 18 mounted relative to the vehicle frame 28 at the underbody 25. The vehicle frame 28 (sometimes referred to simply as a "frame") is the main supporting structure of the electrified vehicle 10, to which various components are attached, either directly or indirectly. The vehicle frame 28 may include a unibody construction, in which the chassis and body of the electrified vehicle 10 are integrated into one another, or may be part of a body-on-frame construction. The vehicle frame 28 may be made of a metallic material, such as steel, carbon steel, or an aluminum alloy, as non-limiting examples.

The vehicle frame 28 includes a plurality of frame members 38, which may be configured as longitudinally or horizontally extending rails/beams. FIG. 3 shows one such frame member 38, however, the vehicle frame 28 could include additional frame members.

One or more mounting linkages 40 may be used to mount the traction battery pack 18 to the frame member 38. The mounting linkage 40 may be welded, bolted, or both welded and bolted to the traction battery pack 18 and to the frame member 38. The total number and configuration of the mounting linkages 40 used to mount the traction battery pack 18 relative to the underbody 25 may vary per vehicle design and is therefore not intended to limit this disclosure. In the mounted position, a gap G may extend between the traction battery pack 18 and the frame member 38. It should be recognized that the gap G is not shown to scale and has been exaggerated to better illustrate certain features of this disclosure.

An isolator 42 may optionally be secured between the frame member 38 and the mounting linkage 40. The isolator 42, which may be referred to as a bushing, is configured to dampen energy that is transmitted to the vehicle frame 28 and may thus acts as a point of isolation for isolating the traction battery pack 18 from vibrations and other loads that may act on the vehicle frame 28.

The isolator 42 may permit a relatively small amount of movement to occur between the traction battery pack 18 and the vehicle frame 28. For example, the isolator 42 may allow the traction battery pack 18 to move in multiple degrees of freedom relative to the frame member 38 in order to create a modal misalignment between the traction battery pack 18 and the vehicle frame 28. The modal misalignment can be effective to isolate the traction battery pack 18 from at least some of the loads that may act on the vehicle frame 28.

Due at least in part to the mounting location at the underbody 25, the size of the gap G, and/or the relative motion that may occur between the traction battery pack 18 and the frame member 38 during vehicle operation, debris D (e.g., a rock, stone, etc.) could become lodged or otherwise captured within the gap G and impinge on the traction battery pack 18, thereby applying an impingement load against the outer enclosure assembly 30. In some instances, the impingement load could be applied in the vicinity of the vent feature 36 or could even pierce the vent feature 36, thereby undermining its functionality. This disclosure is therefore directed to protection brackets designed for shielding the vent feature 36 from debris impingement.

Figure 5:
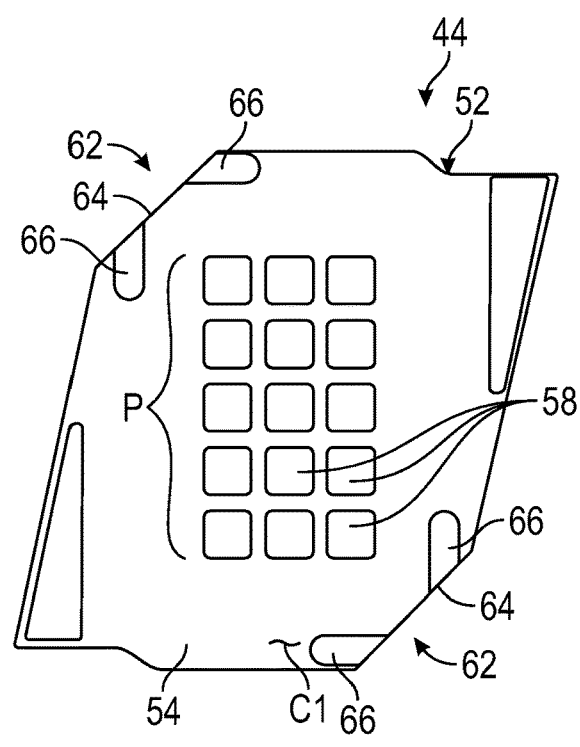
FIG. 5 is a front view of the protection bracket of FIG. 4.
Figure 6:
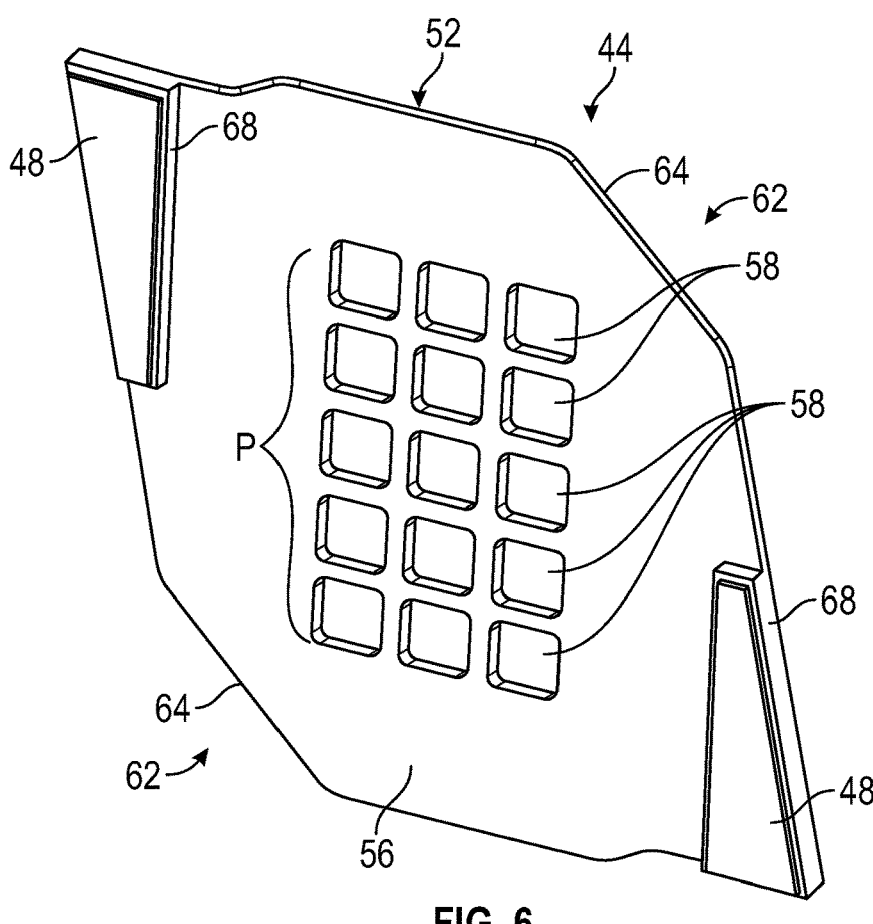
FIG. 6 is a rear view of the protection bracket of FIG. 4.

FIGS. 4, 5, and 6 illustrate an exemplary protection bracket 44 for shielding the vent feature 36 of the outer enclosure assembly 30 of the traction battery pack 18 from debris impingement that could occur during operation of the electrified vehicle 10. The protection bracket 44 may be positioned over the vent feature 36 and may be secured to a surface 46 of the outer enclosure assembly 30. The surface 46 may be part of the tray 32 or the cover 34, depending on the mounting location of the vent feature 36. When mounted to the surface 46, the protection bracket 44 substantially covers the vent feature 36 for directing debris away from the vent feature 36 in debris impingement scenarios.

Figure 7:
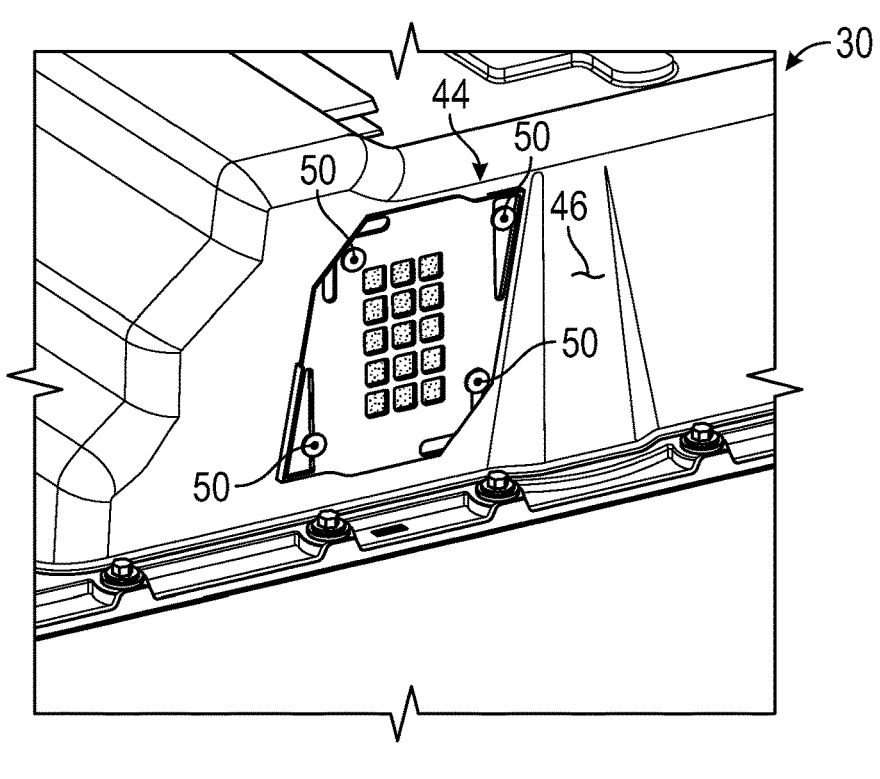
FIG. 7 illustrates an exemplary mounting configuration of a protection bracket for a traction battery pack.

In an embodiment, the protection bracket 44 is secured to the surface 46 of the outer enclosure assembly 30 using one or more sections of two-sided adhesive tape 48 (see, e.g., FIGS. 4 and 6). In another embodiment, the protection bracket 44 is secured to the surface 46 using one or more mechanical fasteners 50, such as bolts or screws, for example (see, e.g., FIG. 7).

The protection bracket 44 may include a polymeric body 52 having a front surface 54 (see FIG. 5) and a rear surface 56 (see FIG. 6). When the protection bracket 44 is mounted to the outer enclosure assembly 30, the front surface 54 of the polymeric body 52 faces in a direction away from the surface 46 of the outer enclosure assembly 30, and the rear surface 56 of the polymeric body 52 faces in a direction toward and interfaces with the surface 46 of the outer enclosure assembly 30.

In an embodiment, a melting point of the polymeric body 52 is less than a temperature of battery vent byproducts V (see FIG. 4) that may be vented by the traction battery pack 18 during battery thermal events (e.g., overcharging, over-discharging, overheating, etc.). The protection bracket 44 therefore cannot block the battery vent byproducts V from escaping the outer enclosure assembly 30 during thermal runaway events.

In an embodiment, the polymeric body 52 of the protection bracket 44 is made of polypropylene. However, other polymeric materials could alternatively be utilized to construct the protection bracket 44. The polymeric body 52 may be made of a different material compared to both the vent feature 36 and the surface 46 of the outer enclosure assembly 30.

At least a portion of the polymeric body 52, such as the front surface 54, for example, may include a first color C1. The first color C1 may be a different color from a second color C2 of the vent feature 36 or a third color C3 of the surface 46 of the outer enclosure assembly 30. In an embodiment, the first color C1, the second color C2, and the third color C3 are each different colors for simplifying assembly of the traction battery pack 18 during manufacturing.

A plurality of openings 58 may be formed through the polymeric body 52 of the protection bracket 44. The openings 58 may extend completely through the polymeric body 52 and therefore open through both the front surface 54 and the rear surface 56.

The openings 58 may be arranged in a mesh pattern P. The mesh pattern P is configured to enable the vent feature 36 to continue to provide its pressure equalization functionality even though partially covered by the protection bracket 44. The mesh pattern P may further establish a cross-sectional area that is about equivalent to a cross-sectional area of an opening 60 (see FIG. 4) of the outer enclosure assembly 30 that is covered by the vent feature 36 so as to avoid obstructing the battery vent byproducts V during thermal runaway events. In this disclosure, the term "about" means that the expressed quantities or ranges need not be exact but may be approximated and/or larger or smaller, reflecting acceptable tolerances, conversion factors, measurement error, etc.

The polymeric body 52 of the protection bracket 44 may include one or more clipped corners 62 (two shown). The clipped corners 62 establish straight edges 64 for aiding the alignment of the protection bracket 44 relative to the vent feature 36 and/or the surface 46 during assembly.

One or more impressions 66 may be formed in the front surface 54 of the polymeric body 52 at a location near the clipped corners 62. The impressions 66 are configured to provide visual alignment features for aligning the protection bracket 44 relative to paint lines on the outer enclosure assembly 30 during assembly.

One or more mounting pads 68 (two shown) may be provided on the rear surface 56 of the polymeric body 52. The mounting pads 68 provide surfaces for securing sections of the two-sided adhesive tape 48 to the protection bracket 44. The mounting pads 68 may be disposed near corners of the polymeric body 52 that are on opposite sides from the clipped corners 62. In an embodiment, the mounting pads 68 are triangular shaped. However, other shapes could alternatively be utilized within the scope of this disclosure.

Figure 8:
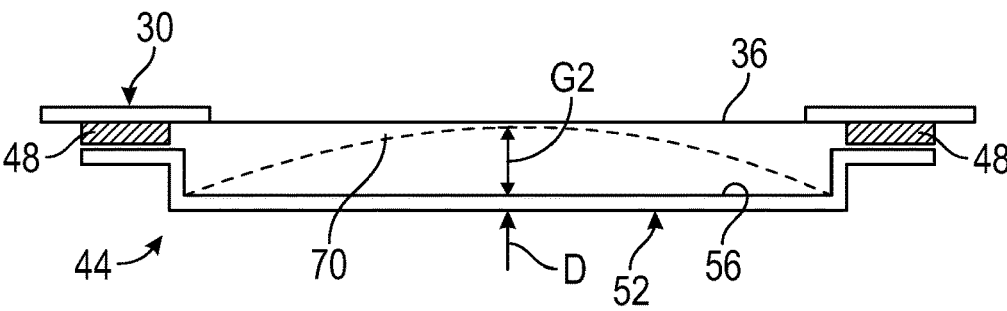
FIG. 8 is a cross-sectional view through section 7-7 of FIG. 4.

Referring now primarily to the cross-sectional image of FIG. 8, a gap G2 may extend between the vent feature 36 and the rear surface 56 of the polymeric body 52 in the installed position of the protection bracket 44. The gap G2 may be specifically engineered such that a maximum forced deflection 70 (shown in dashed lines) of the polymeric body 52 from an impinged piece of debris D will still not cause the protection bracket 44 to move into impinging contact with the vent feature 36. In an embodiment, the maximum forced deflection 70 is substantially equivalent to the amount the traction battery pack 18 is permitted to move relative to the frame member 38 (e.g., via the isolators 42). The maximum forced deflection 70 may be about 3.5 mm, for example, although other deflection amounts could be implemented per specific design requirements.

The exemplary protection brackets of this disclosure shield the traction battery vent feature from rock or other debris impingement, such as in scenarios where the traction battery pack and vehicle frame are permitted to have relative motion. The exemplary protection brackets may further promote deflection of debris away from the vent feature without blocking vent gases during battery thermal events. Finally, the proposed brackets reduce assembly complexities by, for example, avoiding the need for tooling changes for interfacing parts.

Although the different non-limiting embodiments are illustrated as having specific components or steps, the embodiments of this disclosure are not limited to those particular combinations. It is possible to use some of the components or features from any of the non-limiting embodiments in combination with features or components from any of the other non-limiting embodiments.

It should be understood that like reference numerals identify corresponding or similar elements throughout the several drawings. It should be understood that although a particular component arrangement is disclosed and illustrated in these exemplary embodiments, other arrangements could also benefit from the teachings of this disclosure.

The foregoing description shall be interpreted as illustrative and not in any limiting sense. A worker of ordinary skill in the art would understand that certain modifications could come within the scope of this disclosure. For these reasons, the following claims should be studied to determine the true scope and content of this disclosure.

What is claimed is:

1. A traction battery pack, comprising:
an outer enclosure assembly;
a vent feature mounted to a portion of the outer enclosure assembly;
a protection bracket arranged relative to the vent feature and configured to shield the vent feature from debris impingement,
wherein the protection bracket includes a polymeric body having a front surface that faces in a direction away from the vent feature, a rear surface that faces in a direction toward the vent feature, and a mounting pad that protrudes outwardly from the rear surface; and
a two-sided adhesive tape secured to the mounting pad and to the portion of the outer enclosure assembly.

2. The traction battery pack as recited in claim 1, wherein the portion is part of a cover or a tray of the outer enclosure assembly.

3. The traction battery pack as recited in claim 1, wherein the vent feature is a vent patch.

4. The traction battery pack as recited in claim 1, wherein the polymeric body is comprised of polypropylene.

5. The traction battery pack as recited in claim 1, wherein the polymeric body includes a melting point that is less than a temperature of a battery vent byproduct of the traction battery pack.

6. The traction battery pack as recited in claim 1, comprising a plurality of openings formed through the polymeric body.

7. The traction battery pack as recited in claim 6, wherein the plurality of openings is arranged in a mesh pattern.

8. The traction battery pack as recited in claim 7, wherein the mesh pattern includes a first cross-sectional area that is about equivalent to a second cross-sectional area of an opening of the outer enclosure assembly that is covered by the vent feature.

9. The traction battery pack as recited in claim 1, wherein the front surface includes at least one clipped corner that establishes a straight edge for aligning the protection bracket relative to the vent feature.

10. The traction battery pack as recited in claim 9, wherein the mounting pad is provided on an opposite side of the protection bracket from the at least one clipped corner.

11. The traction battery pack as recited in claim 1, wherein the front surface includes a first impression adapted for aligning the protection bracket relative to a first paint line of the outer enclosure assembly.

12. The traction battery pack as recited in claim 11, wherein the front surface includes a second impression adapted for aligning the protection bracket relative to a second paint line of the outer enclosure assembly.

13. The traction battery pack as recited in claim 1, wherein the mounting pad is provided at a first corner of the protection bracket.

14. The traction battery pack as recited in claim 13, comprising a second mounting pad provided at a second corner of the protection bracket, wherein the second corner is diagonally opposite of the first corner.

15. The traction battery pack as recited in claim 14, comprising a straight edge at a third corner of the protection bracket.

16. The traction battery pack as recited in claim 1, wherein a maximum forced deflection of the polymeric body is about equal to an amount of relative movement permitted between the traction battery pack and a frame member the traction battery pack is mounted to.

17. The traction battery pack as recited in claim 1, wherein the front surface of the protection bracket includes a first color, the vent feature includes a second color, and the portion of the outer enclosure assembly includes a third color, wherein the first color, the second color, and the third color are all different colors.

18. The traction battery pack as recited in claim 1, comprising a plurality of commonly sized and shaped openings formed through the polymeric body and arranged in a mesh pattern, wherein the mesh pattern includes a plurality of rows and a plurality of columns of the plurality of commonly sized and shaped openings.

19. A traction battery pack, comprising:
an outer enclosure assembly;
a vent feature mounted to a portion of the outer enclosure assembly;
a protection bracket arranged relative to the vent feature and configured to shield the vent feature from debris impingement, wherein the protection bracket includes a polymeric body having a front surface that faces in a direction away from the vent feature, a rear surface that faces in a direction toward the vent feature, and a mounting pad that protrudes outwardly from the rear surface;
a two-sided adhesive tape secured to the mounting pad and to the portion of the outer enclosure assembly, and
wherein the protection bracket includes a clipped corner provided on an opposite side of the protection bracket from the mounting pad, wherein the front surface of the protection bracket includes an impression adapted for aligning the protection bracket relative to a paint line of the outer enclosure assembly.

* * * * *